United States Patent [19]
Mizikovsky et al.

[11] Patent Number: 5,794,139
[45] Date of Patent: *Aug. 11, 1998

[54] AUTOMATIC GENERATION OF PRIVATE AUTHENTICATION KEY FOR WIRELESS COMMUNICATION SYSTEMS

[75] Inventors: Semyon Mizikovsky, Union, N.J.; Geoffrey Anderson, Cornwell, N.Y.; Peter Douma, Wyckoff; Masaaki Akahane, Mahwah, both of N.J.; Hiroshi Yasuda, Yokohama, Japan

[73] Assignees: Sony Corporation, Tokyo, Japan; Sony Electronics, Inc., Park Ridge, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 541,528

[22] Filed: Oct. 10, 1995

Related U.S. Application Data

[63] Continuation of Ser. No. 296,891, Aug. 29, 1994.

[51] Int. Cl.$^6$ .................... H04Q 7/38; H04Q 7/20
[52] U.S. Cl. .................... 455/403; 380/23
[58] Field of Search ............ 379/58, 59, 61, 379/63; 380/21, 23, 28, 43, 44, 46, 47, 48, 49, 50; 340/825.31, 825.34; 455/33.1, 33.3, 54.1

[56] References Cited

U.S. PATENT DOCUMENTS

| | | | |
|---|---|---|---|
| 5,091,942 | 2/1992 | Dent | 379/59 X |
| 5,237,612 | 8/1993 | Raith | 379/59 X |
| 5,241,598 | 8/1993 | Raith | 379/59 X |
| 5,325,419 | 6/1994 | Connolly et al. | 379/60 |
| 5,513,245 | 4/1996 | Mizikovsky et al. | 379/59 |
| 5,551,073 | 8/1996 | Sammarco | 455/89 |
| 5,557,654 | 9/1996 | Maenpaa | 379/58 |
| 5,592,533 | 1/1997 | McHenry et al. | 379/58 |
| 5,596,641 | 1/1997 | Ohashi et al. | 380/23 |

*Primary Examiner*—William Cumming
*Attorney, Agent, or Firm*—Frommer, Lawrence & Haug LLP; William S. Frommer

[57] ABSTRACT

Apparatus and method for automatically generating an authentication key (A-Key) in a mobile station wherein the mobile station periodically receives random numbers from a base station, and automatically generates the authentication key from a received random number and from mobile station identification data stored in the mobile station. The mobile station identification data may include the electronic serial number of the mobile station, a user selected value, and a cellular system selected value. In addition, mixing registers may be utilized by an encoding algorithm, such as the CAVE algorithm, for encoding the random numbers and the identification data to automatically generate the mobile station authentication key.

31 Claims, 7 Drawing Sheets

AUTOMATIC GENERATION OF PRIVATE AUTHENTICATION KEY FOR WIRELESS COMMUNICATION SYSTEMS

This application is a continuation of application Ser. No. 08/296,891, filed Aug. 29, 1994.

BACKGROUND OF THE INVENTION

This invention relates to cellular mobile telephone systems and, more particularly, to apparatus and method for automatically generating a private authentication key (A-Key) in a mobile station.

Current cellular mobile telephone systems typically include subscriber units, known as mobile stations (e.g., hand-held units or units installed in vehicles), which communicate with a cellular communications network via RF transmissions. A typical cellular communications network includes at least one base station which provides the means by which a mobile station accesses cellular network services. Cellular networks need to ensure that their services are being provided only to legitimate subscribers, and in order to ensure that only legitimate subscribers use available resources, cellular networks employ various systems to authenticate their users. In the cellular communications setting, the term "authentication" refers to the process during which information is exchanged between the mobile station and the base station for the purpose of enabling the base station to confirm the identity of the mobile station.

Generally, a cellular network authenticates a mobile station by comparing so-called "shared secret data" (SSD) stored in the mobile station with corresponding shared secret data stored in the cellular network. The shared secret data stored in the mobile station is derived from a combination of mobile station identifying data, random data supplied by the base station, and a private authentication key (A-Key). The mobile station identification data may include an electronic serial number (ESN) which uniquely identifies the mobile station to any cellular system, and which includes the identity of the manufacturer of the mobile station and the serial number assigned by the manufacturer to that mobile station, plus a mobile identification number (MIN) which is derived from the mobile station's 10 digit directory telephone number. The private authentication key (A-Key) is a secret number known only by the mobile station and the mobile station's "home" cellular system, and is used as an encryption key to encrypt various data.

In a typical cellular communications system, each subscriber unit (i.e., mobile station) is assigned a telephone number (i.e. the MIN) which uniquely identifies the subscriber to any cellular network. A mobile station's electronic serial number (ESN) also uniquely identifies the mobile station. The cellular network has access to the mobile identification number (MIN) and the electronic serial number (ESN) of a mobile station through a data base, and this information is used to bill subscribers for the time the subscriber uses the system. However, detection of a legitimate mobile station's mobile identification number (MIN) and its electronic serial number (ESN) may be accomplished by RF ease-dropping or by purposeful or inadvertent divulgence of this information by the cellular telephone installer. Once the mobile station's mobile identification number (MIN) and its electronic serial number (ESN) are known, referred to as the MIN/ESN combination, a thief (i.e., an unauthorized user) is able to reprogram another mobile station with the stolen information causing two or more mobile stations to have the same MIN/ESN combination. Authorized subscribers would then be billed for calls made by the thief. In addition, since the MIN and ESN are transmitted without first being enciphered, RF detection of the MIN/ESN combination may easily be accomplished.

The current standardized method for authentication (and also for message encryption and information privacy in digital cellular systems) utilizes a private authentication key, known as the "A-Key". When a subscriber seeks to utilize the cellular network, the network generates and transmits a random number (RAND) to the mobile station. The mobile station then retrieves the values of its A-Key, its electronic serial number (ESN) and its mobile identification number (MIN) from its memory, and enciphers the ESN and MIN using the A-Key to construct the RAND into a signed response, which is then transmitted to the cellular network via a base station. At the same time, the network retrieves the values of the mobile station's ESN, MIN and A-Key from its data base, and generates an expected signed response value to the same random number (RAND) using the retrieved values. Upon receipt of the mobile station's signed response, the network compares the mobile station's signed response to the cellular network's generated expected signed response, and if the responses are substantially equivalent, authentication is confirmed. This system affords some protection against a thief that acquires the MIN/ESN combination of a mobile station by enciphering these numbers.

The A-Key utilized to encipher the mobile station's MIN/ESN is represented by a 64 bit number in current cellular systems. This number is known only by the mobile station and the mobile station's home system (which is retained in a home location register of the home cellular system) and is associated with the mobile station's MIN/ESN. When the mobile station is initially shipped from the manufacturer, the A-Key is set to the default value of all binary zeros. Upon installation of the mobile station (e.g., by the mobile station user or by a technician of a retailer of the mobile station), the installer contacts a selected cellular service provider (e.g., the customer service center of a cellular network) on a land-line telephone. The installer informs the service provider of the manufacturer of the mobile station and its serial number. The service provider verifies the manufacture and the serial number (which has been uniquely assigned by the manufacturer) and instructs the installer to enter a special programming mode of operation of the mobile station. In the special programming mode, the mobile station generates and displays a random five digit "user selected value" (USV). Alternatively, the installer may be instructed by the service provider to randomly select the five digit user selected value USV, enter that number into the mobile station and notify the service provider of the selected USV over the land-line telephone.

The service provider issues the private authentication key (A-Key) to the installer over the land-line telephone who then enters the number into the mobile station. Present standards require that the issued A-Key must be at least six digits long but not longer than 26. If this number is less than 26 digits long, the leading most significant digits are set equal to zero in order to produce a 26 digit quantity called the "entry value". The mobile station checks the accuracy of the 26 digit (decimal) entry value by converting the first 20 digits into a 64 bit representation to serve as an input to the well known cellular authentication and voice encryption (CAVE) algorithm, along with the mobile station's ESN. The algorithm produces an 18 bit response, which is compared to the binary equivalent of the last 6 entered digits. A match causes the 64 bit pattern to become written to the mobile station's semi-permanent memory as the A-Key. The cellular network also stores the 64 bit pattern as the mobile station's A-Key in its data base with the mobile station's ESN and MIN.

Although the above described enciphering method ensures some protection against unauthorized use by a "clone" mobile station, the manual entry of the A-Key into the mobile station requires knowledge of the value of the A-Key by the installer of the mobile station and the customer service representative of the cellular service provider. In addition, unauthorized divulgence of the A-Key may be accomplished by intercepting this information via the landline telephone or other unlawful methods. In addition, since the entry number is entered manually by the installer, such entry is both cumbersome and prone to errors. For these reasons, there exists a need to eliminate the manual entry of the A-Key into the mobile station, and a means for generating the A-Key which does not unnecessarily divulge the A-Key.

OBJECTS OF THE INVENTION

Therefore, it is an object of the present invention to provide improvements which overcome the aforementioned disadvantages and drawbacks associated with conventional cellular telephone systems.

Another object of the present invention is to eliminate manual entry of the private authentication key (A-Key) into the mobile station.

A further object of this invention is to provide a technique for automatically generating the A-Key which provides simple and secure activation of the mobile station over the air waves.

An additional object of this invention is to generate the A-Key automatically in order to prevent inadvertent or deliberate divulgence of the A-Key.

Still another object of the present invention is to provide for the automatic generation of the A-Key in order to prevent the value of the A-Key from becoming known even when the mobile station's MIN and ESN are known.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for use in a cellular mobile telephone system in which data signals are communicated between a mobile station and a base station, and in which the mobile station receives a unique random number from the base station, and automatically generates (e.g., by a predetermined encoding algorithm) an authentication key from the received unique random number and mobile station identification data stored in the mobile station.

As one aspect of the present invention, the mobile station also receives a global random number from the base station, and the global random number is also utilized for automatically generating the authentication key.

As another aspect of this invention, the mobile station receives the unique random number in a unique challenge authentication order issued by the base station and generates a unique challenge response from the mobile station identification data, the unique random number and the generated authentication key. The mobile station transmits the unique challenge response to the base station so that the base station may verify whether the authentication key was successfully generated by the mobile station.

In accordance with another embodiment of the present invention, the private authentication key is generated in a mobile station which has a unique electronic serial number associated therewith and is capable of producing a user selected value. The electronic serial number and the user selected value are supplied from the mobile station to a service provider who issues a system selected value to the mobile station. A random challenge number is received by the mobile station on a broadcast forward control channel which is transmitted by a base station, and a unique random number included in a unique challenge authentication order transmitted by the base station also is received. Mixing registers are loaded with the electronic serial number, the user selected value, the system selected value, the random challenge number and the unique random number, and a linear feedback shift register is set to a value which is a predetermined function of the values in the mixing registers. An offset index for a predetermined algorithm is set to a value which is a predetermined function of the user selected value and the unique random number, and another offset index for the predetermined algorithm is set to a value which is a function of the system selected value and the unique random number. The predetermined algorithm is run a preselected number of rounds, and the authentication key is set to a value which is another function of the values in the mixing registers.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
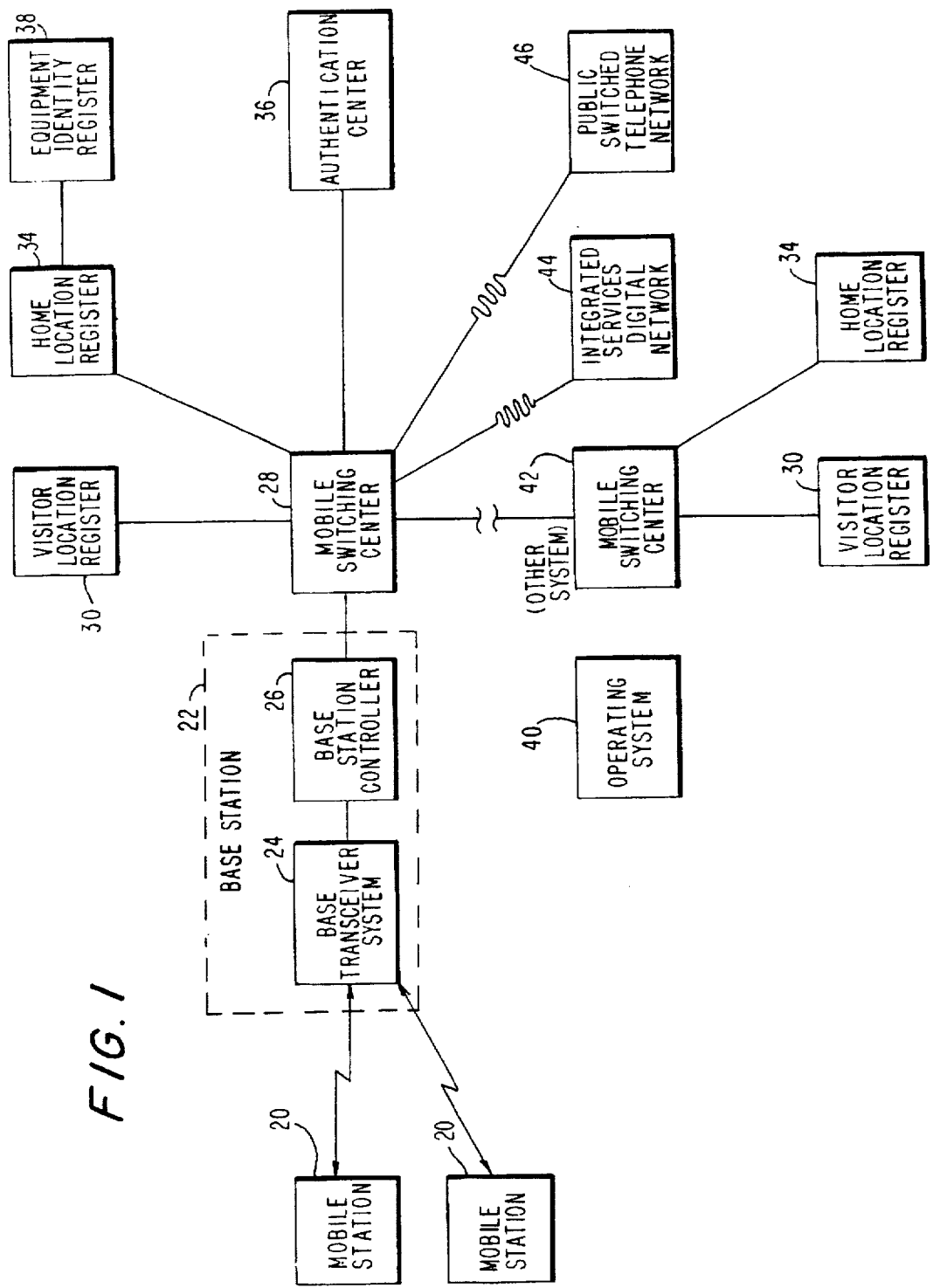
FIG. 1 is a schematic block diagram of a cellular communications environment.

Referring now to the drawings, FIG. 1 is a block diagram of a cellular communications network which includes any number of mobile stations 20, a base station 22 and a mobile switching center 28. Base station 22 typically comprises a base transceiver system 24 and a base station controller 26 and serves as a node of the cellular network to provide communication services or resources to mobile stations 20. Mobile switching center 28 switches mobile station originated and terminated traffic and connects the base stations to other public networks, which may include an integrated services digital network 44 and a public switched telephone network 46, as well as other mobile switching centers in the same network or mobile switching centers 42 in different networks. The cellular communications network further includes a home location register 34 which contains the mobile identification number (MIN) and current location of each mobile station to which the network is "home". Home location register 34 may also include each mobile station's electronic serial number (ESN), subscriber profile, private and public authentication variables, etc, and may serve more than one mobile switching center. Visitor location registers 30 (each serving a different mobile switching center) contain information on mobile stations presently visiting the mobile switching center, wherein the visitor location register is used to provide or deny access to network services, and may include the electronic serial number (ESN) of a mobile station, subscriber profile, public authentication variables, etc., but not the private authentication variables of "visiting" mobile stations. The cellular communication network also includes an authentication center 36 which manages authentication and encryption keys associated with individual home subscribers, and an equipment identity register 38 which administers a mobile station's identity information. An operating system 40 is responsible for the overall management of the cellular network.

The manner in which the illustrated mobile cellular network operates is described in various texts, including, for example, Mobile Cellular Telecommunications Systems by William C. Y. Lee, McGraw-Hill Book Company (1989), and further description is not provided herein, except as needed to understand the present invention.

Figure 2:
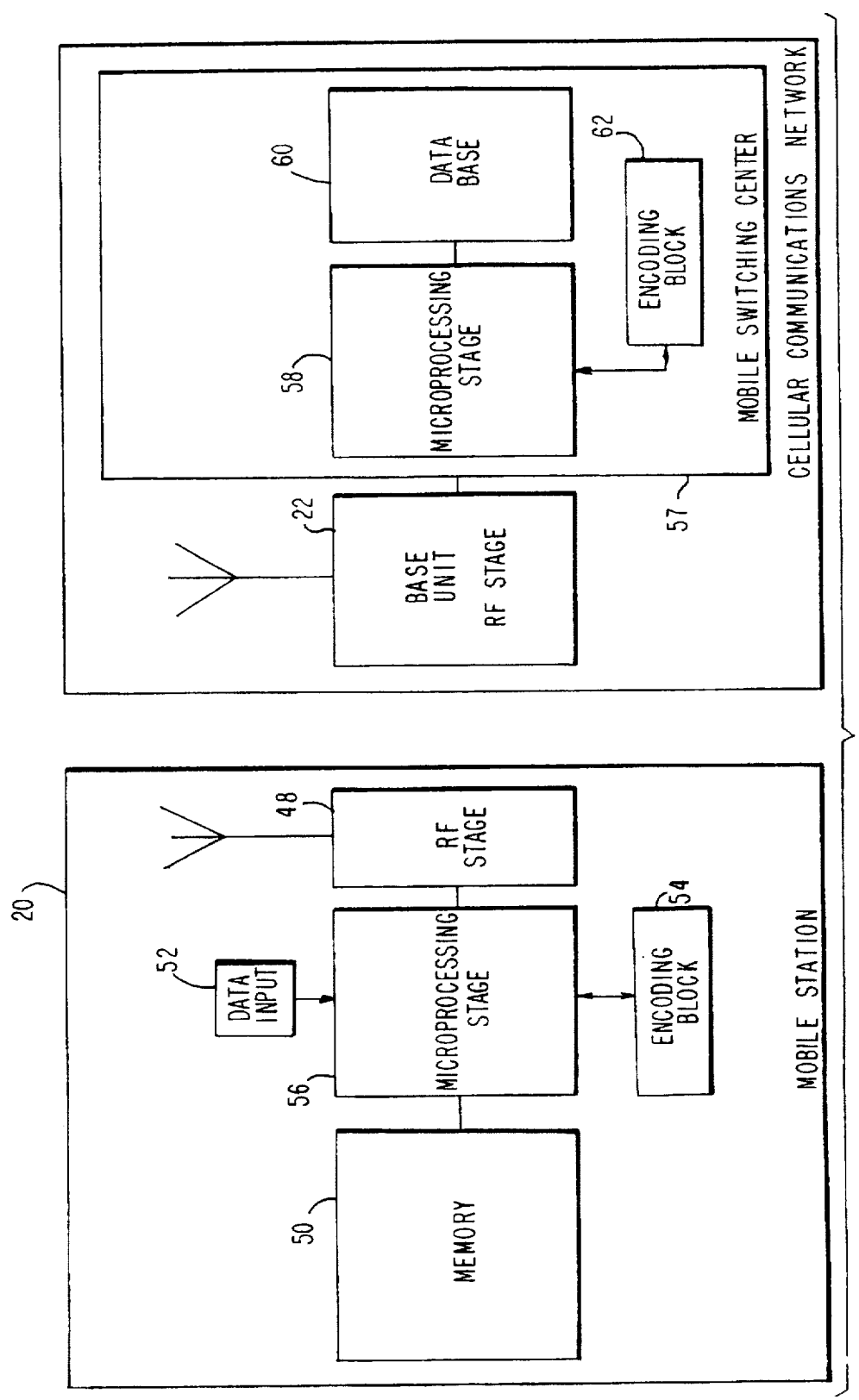
FIG. 2 is a block diagram of a mobile station, a base station, and a mobile switching center.

Referring now to FIG. 2, a block diagram representing mobile station 20, base station 22, and a mobile switching center 57 is illustrated. Only those portions of the mobile station and cellular network which are needed for an understanding of the present invention are illustrated and described. Accordingly, mobile station 20 is comprised of a radio frequency (RF) stage 48, a memory 50, a data input block 52, an encoding block 54, and a microprocessing stage 56. RF stage 48 transmits and receives RF signals to and from a base station of the cellular network, the operation of which is well known in the art. Within memory unit 50 of mobile station 20 resides the mobile station's electronic serial number (ESN), the mobile station's telephone number (i.e., its MIN), a user selected value (USV), a system selected value (SSV), and an authentication algorithm variable (AAV) (to be described). Data input block 52 provides the means by which a user of the mobile station enters data, which is typically in the form of a telephone key entry pad. Encoding block 54 provides the means by which various data are enciphered (to be described), and microprocessing stage 56 comprises a microprocessor, internal memory, buffering, etc., and controls the mobile station's operation. The construction and operation of the microprocessing stage are well known in the art.

For the purpose of simplifying the description of this invention, it is assumed that mobile station 20 is communicating directly with a switching center in its "Home" network. Accordingly, mobile station 20 communicates with switching center 57 via base station 22, wherein switching center 57 comprises a microprocessing stage 58, a data base 60, and an encoding block 62. Data base 60 of switching center 57 generally includes, inter alia, the same information that is stored in memory 50 of mobile station 20.

Figure 3:
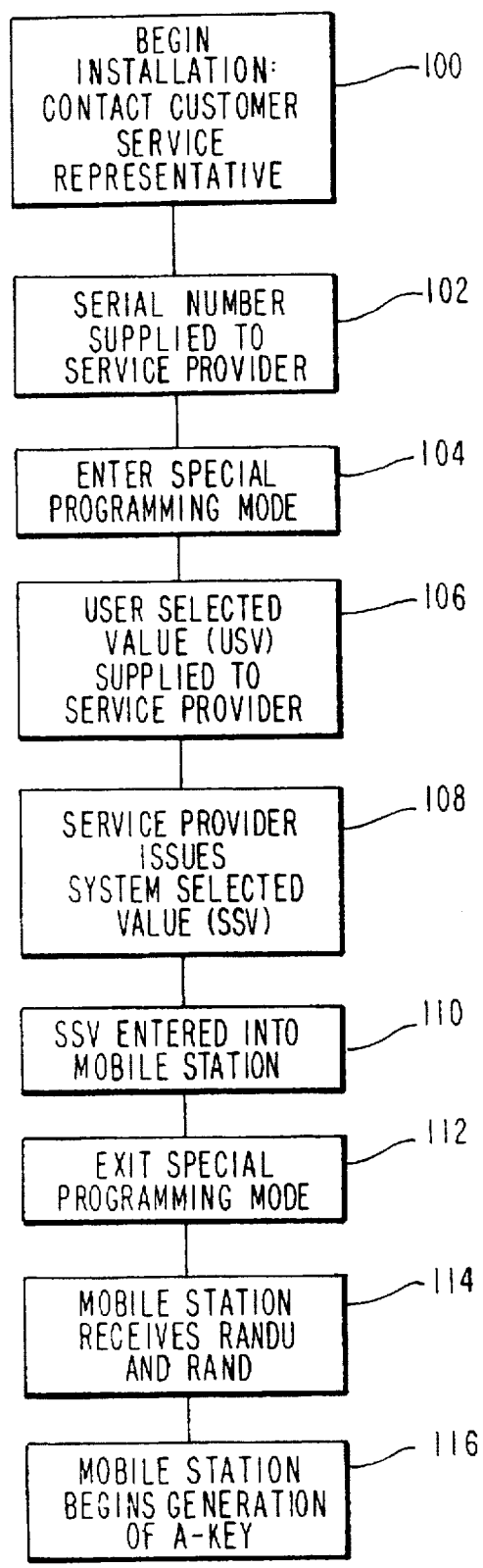
FIG. 3 is a flow chart representing the operation of the installation of the mobile station.

The manner in which mobile station 20 automatically generates the private authentication key (A-Key) now will be described in conjunction with FIGS. 3 to 7. It will be appreciated that the flow charts of FIGS. 3 and 5 represent the operation of microprocessing stage 56 and encoding block 54 in conjunction with data input block 52 of mobile station 20. From the following description, one of ordinary skill in the art will fully appreciate that the base station operates in a similar manner and, therefore, in the interest of brevity, similar flowcharts describing the operation of microprocessing stage 58 and encoding block 62 in mobile switching center 57 of the cellular communications network are not needed.

When a new mobile station 20 is to be installed, the ultimate user of the mobile station or a technician of a retailer contacts the customer service center of the selected cellular service provider on a land-line telephone, as represented by instruction 100 of the flowchart shown in FIG. 3. As shown by instruction 102, the installer of the mobile station informs the customer service representative of the manufacturer of the mobile station and its serial number. The electronic serial no. (ESN) of mobile station 20 is generated from the mobile station's serial number and the manufacturer's code, wherein the ESN uniquely identifies mobile station 20 to any cellular system.

Mobile station 20 enters a special programming mode of operation (during an initial installation operation), as shown by instruction 104, wherein the mobile station generates and displays a five digit random number, known as the mobile station's user selected value (USV). Alternatively, the installer may be instructed by the customer service representative to randomly select a five digit user selected value (USV), and enter it into mobile station 20 via its keypad in data input block 52. The mobile station's user selected value (USV) is reported by the installer to the customer service representative, as indicated by instruction 106. The customer service representative then issues a five digit system selected value (SSV) over the land-line telephone to the installer, as indicated by instruction 108. As shown by instruction 110, the installer is then instructed to enter the five digit system selected value (SSV) into mobile station 20 via its keypad. The user selected value (USV) and the system selected value (SSV) are stored in memory 50 of mobile station 20. The installer is instructed by the customer service representative to exit the special programming mode, as indicated by instruction 112, and to resume normal operation of mobile station 20.

It is appreciated that the telephone number of mobile station 20 is manually or automatically generated in the special programming mode as is known to those of ordinary skill in the art.

Base station 22 periodically transmits over a forward control channel random challenge global action messages (in the overhead message train), each of which contains a 32 bit global random value RAND, whose value is periodically updated for increased system security. Mobile station 20 receives the global random value RAND over its forward control channel and stores RAND in memory 50. Upon resuming normal operation, mobile station 20 prepares for the receipt of the first unique challenge authentication order which is issued by base station 22. When base station 22 carries out a unique challenge authentication order, it supplies to mobile station 20 on the forward control channel a 24 bit unique random pattern referred to as RANDU. Mobile station 20 stores RANDU in memory 50. Instruction 114 represents receipt of RAND and RANDU in mobile station 20. Upon receipt of the unique challenge authentication order, mobile station 20 begins the process of generating the private authentication key (A-Key), as represented by instruction 116.

Figure 4:
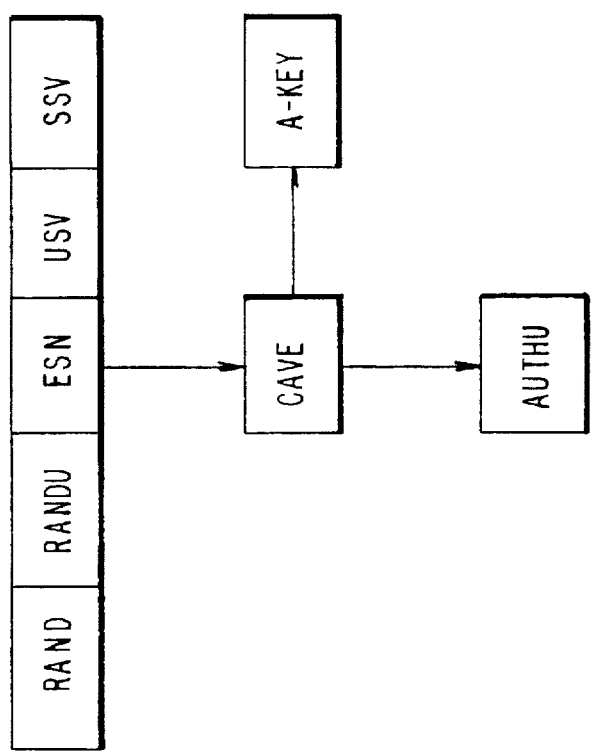
FIG. 4 schematically illustrates the process of producing the authentication key and the unique challenge authentication response AUTHU by utilizing the CAVE algorithm.
Figure 5:
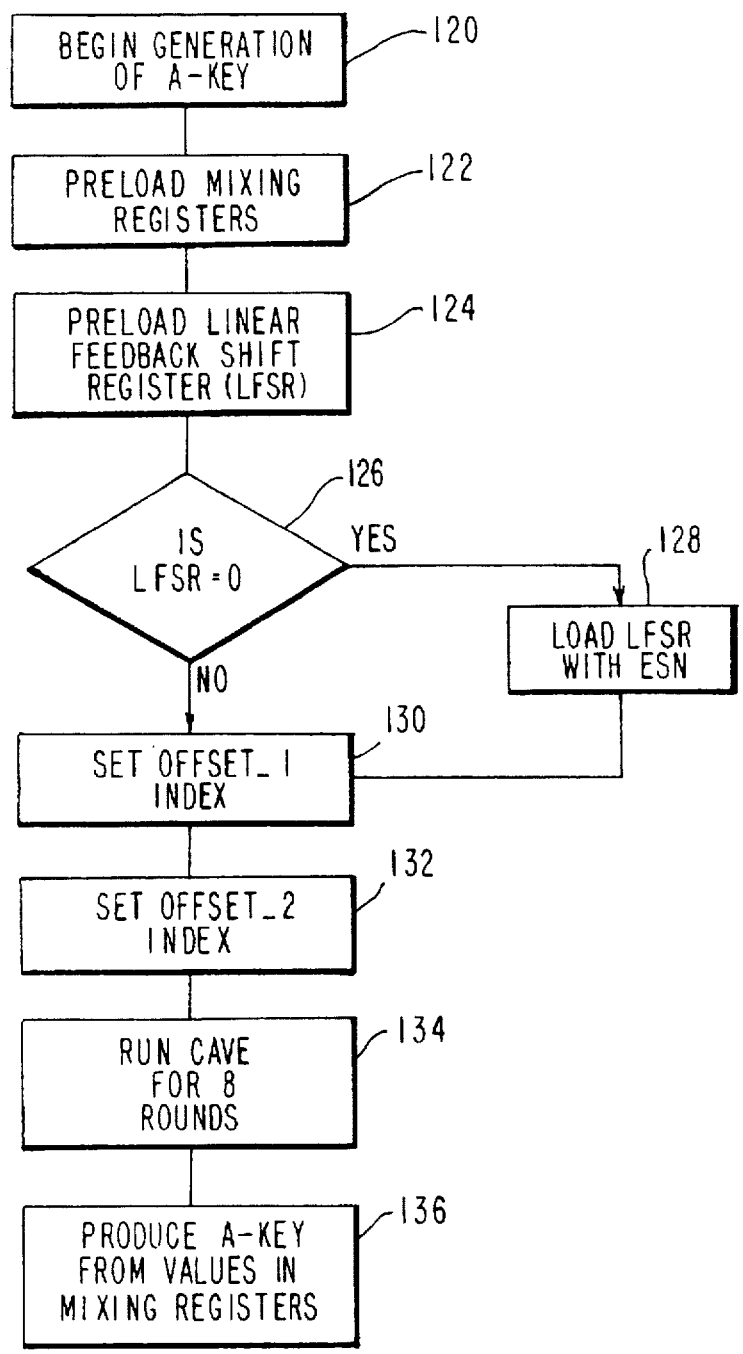
FIG. 5 is a flow chart illustrating the automatic generation of the authentication key.

FIG. 4 schematically illustrates the data which is utilized in the cellular authentication and voice encryption (CAVE)

algorithm to generate the A-Key and the unique challenge authentication response AUTHU (to be described). A description of the CAVE algorithm is described in Appendix A of EIA/TIA (Electronics Industry Association/ Telecommunications Industry Association) Interim Standard IS-54 revision B, which is incorporated herein by reference. As shown in FIG. 4, the global random value RAND, the unique random pattern RANDU, the electronic serial number (ESN), the user selected value (USV), and the system selected value (SSV) are utilized in the encryption algorithm to generate the A-Key and AUTHU. Although the A-Key is generated by utilizing the above-mentioned values, it is contemplated to use only the unique random pattern RANDU and the electronic serial number (ESN) (or other mobile station identifying values) to generate the A-Key.

Figure 6:
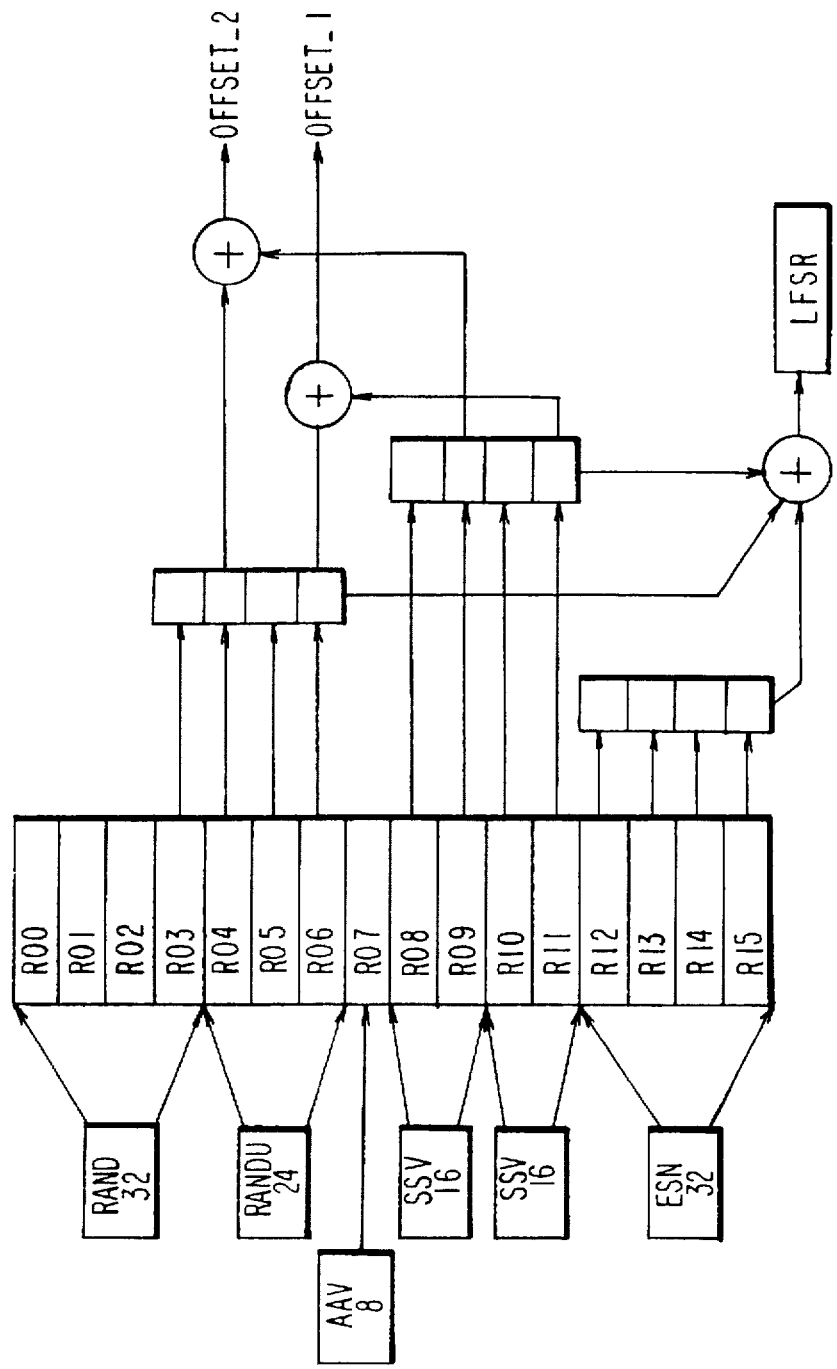
FIG. 6 is a data chart which illustrates how presets for the CAVE algorithm are determined.

Reference now is made to the flowchart shown in FIG. 5 to describe the manner in which the A-Key is automatically generated. As mentioned above, generation of the A-Key begins upon receipt of the unique challenge authentication order, as represented by instruction 120. As shown by instruction 122, sixteen mixing registers R00-R15 of encoding block 54 are preloaded with various data as illustrated in the data chart of FIG. 6. Referring to FIG. 6, registers R00-R03, which comprise a total of 32 bits (each register being 8 bits long), are loaded with the global random value RAND. Registers R04-R06 (24 bits) are loaded with the unique random pattern RANDU. Register R07 is loaded with an authentication algorithm variable (AAV), which is 8 bits long, and is known in the art to indicate the authentication algorithm used in various countries. In the U.S., AAV is generally preset to the value seven (decimal). Registers R08-R09 (16 bits) are loaded with the system selected value (SSV), registers R10-R11 (16 bits) are loaded with the user selected value (USV), and registers R12-R15 (32 bits) are loaded with the electronic serial number (ESN).

As indicated by instruction 124 of FIG. 5, a linear feedback shift register (LFSR) in encoding block 54 of the mobile station 20 is preloaded with the following value,

LFSR=(R03-R06) XOR (R08-R11) XOR (R12-R15), which is illustrated in FIG. 6.

Microprocessing stage 56 in the mobile station carries out inquiry 126 of FIG. 5 to determine if the linear feedback shift register, i.e., the result of the above XOR operation, produces all zeros (i.e., a null result). If so, the linear feedback shift register (LFSR) is loaded with the 32 bit electronic serial number (ESN) in order to prevent a trivial null result, as represented by instruction 128. After the linear feedback shift register (LFSR) is loaded, an OFFSET_1 index which is used in conjunction with the CAVE algorithm is set to a value equal to the eight least significant bits of the binary representation of the user selected value (USV) exclusive ored (XOR) with the eight least significant bits of the unique random pattern RANDU, as represented by instruction 130. Then, as represented by instruction 132, an OFFSET_2 index utilized in conjunction with the CAVE algorithm is set to a value equal to the eight least significant bits of the binary representation of the system selected value (SSV) exclusive ored (XOR) with the eight most significant bits of the unique random pattern RANDU. Generation of the OFFSET_1 index and OFFSET_2 index are illustrated in FIG. 6. It is appreciated that either microprocessing stage 56 or encoding block 54 of mobile station 20 may perform the above calculations and loading operations.

After setting the 16 mixing registers R00-R15, the linear feedback shift register, the OFFSET_1 index and the OFFSET_2 index, the cellular authentication and voice encryption (CAVE) algorithm is run for eight rounds, which "mixes" (i.e., changes) the values in the sixteen mixing registers (i.e., they are encrypted), as represented by instruction 134 of FIG. 5, and whose operation is well known in the art. It is appreciated that other known encryption algorithms may easily be utilized.

Figure 7:
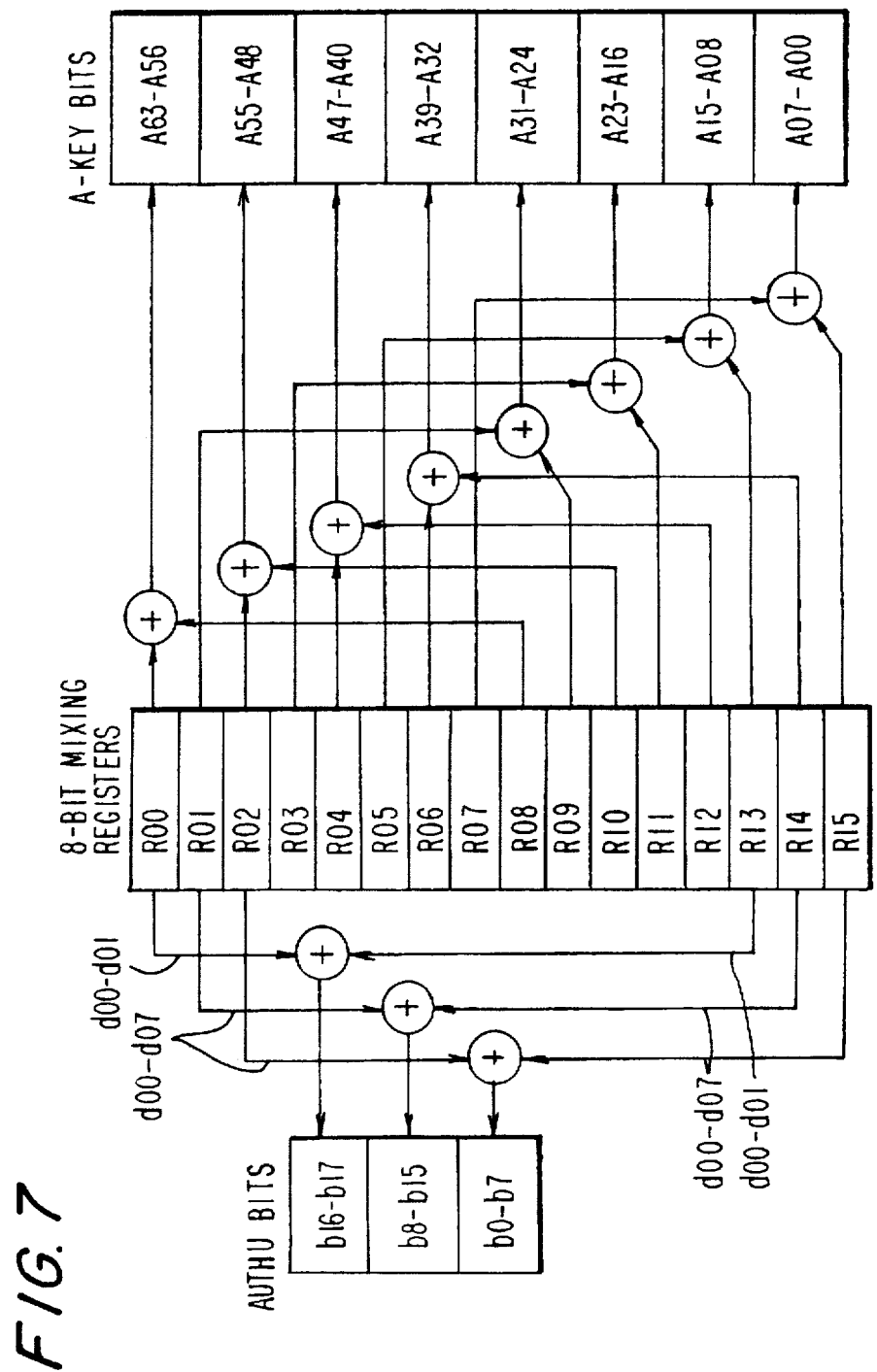
FIG. 7 is a data chart which illustrates how the A-Key and authentication response AUTHU are generated.

Upon completion of running the cellular authentication and voice encryption (CAVE) algorithm, the private authentication key (A-Key) is produced from the "mixed" values in the sixteen mixing registers R00-R15, as indicated by instruction 136, in the manner illustrated in the data chart of FIG. 7. As shown, bits A00-A63 of the A-Key are derived from the following values:

A63 – A56 = R00 XOR R08
A55 – A48 = R01 XOR R09
A47 – A40 = R02 XOR R10
A39 – A32 = R03 XOR R11
A31 – A24 = R04 XOR R12
A23 – A16 = R05 XOR R13
A15 – A08 = R06 XOR R14
A07 – A00 = R07 XOR R15

The A-Key is then stored in memory 50 of mobile station 20. Although not illustrated, it is appreciated that the cellular communications network illustrated in FIG. 2 performs the same operations performed in mobile station 20 such that the A-Key is generated by the network by utilizing the same data utilized by mobile station 20. Similarly, the A-Key is stored in data base 60.

FIG. 7 further illustrates the manner in which the unique challenge authentication response AUTHU is generated from the values of mixing registers R00-R15. Bits b0-b17 of AUTHU are calculated in the following manner:

bits 0-7=R02 XOR R15 bits 8-15=R01 XOR R14 bits 16-17=R00 (bits 0-1) XOR R13 (bits 0-1)

Similarly, the cellular network generates an expected unique authentication response, and compares the received value of AUTHU from mobile station 20 with its internally calculated expected number, and if the numbers are substantially the same, considers the generation of the A-Key successful. Upon successful generation of the A-Key, the cellular network issues an SSD-Update command which activates the A-Key generated in the mobile station, as is known to those of ordinary skill in the art.

The private authentication key (A-Key) of a mobile station is utilized in authentication of mobile station registration, authentication of mobile station origination and authentication of mobile station termination. Divulgence of the A-Key would compromise the detection of unauthorized (e.g., clone) mobile stations. It is appreciated that the A-Key is never transmitted to a base station, and thus, having the A-Key generated automatically during installation of a mobile station greatly decreases the likelihood of divulgence of the A-Key.

Although not specifically described in the foregoing, it is appreciated that different values stored in the mobile station may be loaded automatically into the mixing registers and the linear feedback shift register, and that the number of rounds running the encryption algorithm may be modified. In addition, the A-Key may be generated from various functions of the mixing registers other than those specified specifically mentioned herein.

Since the A-Key is automatically generated by utilizing preset values (e.g. ESN), random variables communicated over a land-line telephone (e.g., USV), and random variables communicated via radio transmissions (e.g. RAND, RANDU), it is extremely difficult to obtain the value of the A-Key. Further, since various variables such as the global random variable RAND and the unique random variable RANDU are not divulged to the installer of the mobile station nor the customer service representative, internal calculation of the A-Key is almost impossible.

It is intended that the appended claims be interpreted as including the embodiments described herein, the alternatives mentioned above, and all equivalents thereto.

What is claimed is:

1. Apparatus for use in a cellular mobile telephone system wherein data signals are communicated between a mobile station and a base station, said mobile station having stored therein mobile station identification data, a global random number periodically received from said base station and a unique random number received from said base station, said apparatus comprising:

unique random number receiving means for receiving said unique random number transmitted by said base station; and authentication key generating means at said mobile station responsive to at least the stored mobile station identification data and unique random number for automatically generating said authentication key, said authentication key being an A-key, and said authentication key generating means being operable to automatically generate said authentication key during an initial installation operation of said mobile station, said authentication key being maintained in semi-permanent memory in a non-transitory, non-transmissible state within said mobile station.

2. The apparatus of claim 1, wherein said mobile station identification data includes a unique electronic serial number associated with said mobile station.

3. The apparatus of claim 1, wherein said mobile station identification data includes a user selected value randomly generated at said mobile station.

4. The apparatus of claim 1, wherein said mobile station identification data includes a system value supplied to said mobile station by a service provider associated with said base station.

5. The apparatus of claim 1, wherein said mobile station identification data includes a unique electronic serial number associated with said mobile station, a user selected value randomly generated at said mobile station, a system value supplied to said mobile station by a service provider associated with said base station, and an authentication algorithm version number.

6. The apparatus of claim 1, wherein said authentication key generating means further responds to the stored global random number for automatically generating said authentication key.

7. The apparatus of claim 6, wherein said authentication key generating means includes registers for storing said mobile station identification data, said global random number and said unique random number.

8. The apparatus of claim 7, wherein said authentication key generating means utilizes the mobile station identification data, the global random number and the unique random number stored in the registers in accordance with a predetermined encoding algorithm to generate said authentication key.

9. The apparatus of claim 8, wherein said predetermined encoding algorithm is a CAVE-type algorithm.

10. The apparatus of claim 8, wherein said authentication key generating means includes means for combining the contents of predetermined registers, and a linear feedback shift register for storing said combined contents.

11. The apparatus of claim 10, further comprising means for loading said linear feedback shift register with an electronic serial number associated with said mobile station when said combined contents is null.

12. The apparatus of claim 10, wherein said authentication key generating means utilizes values stored in said registers and linear feedback shift register for automatically generating said authentication key.

13. The apparatus of claim 1, wherein said unique random number is received in a unique challenge authentication order message transmitted by said base station to said mobile station.

14. The apparatus of claim 13, further comprising unique challenge authentication response generating means at said mobile station for generating a unique challenge authentication response in response to said mobile station identification data, said unique random number and said authentication key, and transmitting means for transmitting to said base station said unique challenge authentication response for use in said base station to verify a successful authentication key generated by said mobile station.

15. In a cellular mobile telephone system wherein a mobile station communicates with a base station, and wherein said mobile station has stored therein mobile station identification data, a global random number periodically received from said base station, and a unique random number received from said base station, the method of automatically generating an authentication key comprising the steps of:

receiving at said mobile station said unique random number from said base station; and automatically generating during an initial installation operation of said mobile station said authentication key in response to said unique random number, said authentication key being an A-key, said authentication key being maintained in semi-permanent memory in a non-transitory, non-transmissible state within said mobile station.

16. The method of claim 15, wherein the step of automatically generating said authentication key is further responsive to said stored mobile station identification data.

17. The method of claim 16, wherein said mobile station identification data includes a unique electronic serial number associated with said mobile station.

18. The method of claim 16, wherein said mobile station identification data includes a user selected value randomly generated at said mobile station.

19. The method of claim 16, wherein said mobile station identification data includes a system value supplied to said mobile station by a service provider associated with said base station.

20. The method of claim 16, wherein said mobile station identification data includes a unique electronic serial number associated with said mobile station, a user selected value randomly generated at said mobile station, a system value supplied to said mobile station by a service provider associated with said base station, and an authentication algorithm version number.

21. The method of claim 16, wherein the step of automatically generating said authentication key is further responsive to the stored global random number.

22. The method of claim 21, further comprising the step of storing said mobile station identification data, said global random number and said unique random number in registers in said mobile station.

23. The method of claim 22, wherein the step of automatically generating said authentication key comprises combining the mobile station identification number, the global random number and the unique random number stored in said registers in accordance with a predetermined encoding algorithm.

24. The method of claim 23, wherein said predetermined encoding algorithm is a CAVE-type algorithm.

25. The method of claim 23, wherein the contents of predetermined registers are combined and then stored in a linear feedback shift register of said mobile station.

26. The method of claim 25, further comprising the step of storing an electronic serial number associated with said mobile station in said linear feedback shift register when the combined contents of said predetermined registers is null.

27. The method of claim 25, wherein the step of automatically generating said authentication key is carried out by utilizing values stored in said registers and linear feedback shift register.

28. The method of claim 25, wherein said unique random number is received in a unique challenge authentication order message transmitted by said base station to said mobile station.

29. The method of claim 28, further comprising the steps of generating at said mobile station a unique challenge authentication response from said authentication key, said mobile station identification data and said unique random number, and transmitting to said base station said unique challenge authentication response for use in said base station to verify a successful authentication key generated by said mobile station.

30. The apparatus of claim 1, wherein said authentication key generating means is not responsive to another authentication key.

31. The method of claim 15, wherein said step of automatically generating said authentication key is not responsive to another authentication key.

\* \* \* \* \*